(12) United States Patent
Lius et al.

(10) Patent No.: US 10,732,747 B2
(45) Date of Patent: Aug. 4, 2020

(54) DISPLAY DEVICE

(71) Applicant: InnoLux Corporation, Miao-Li County (TW)

(72) Inventors: Chandra Lius, Miao-Li County (TW); Kuan-Feng Lee, Miao-Li County (TW); Jui-Jen Yueh, Miao-Li County (TW); Chin-Lung Ting, Miao-Li County (TW)

(73) Assignee: Innolux Corporation, Chu-Nan, Miao-Li County (TW)

( * ) Notice: Subject to any disclaimer, the term of this patent is extended or adjusted under 35 U.S.C. 154(b) by 0 days.

(21) Appl. No.: 15/988,524

(22) Filed: May 24, 2018

(65) Prior Publication Data

US 2019/0361551 A1 Nov. 28, 2019

(51) Int. Cl.
*G06F 3/041* (2006.01)
*G06F 3/14* (2006.01)
*G06F 3/044* (2006.01)
*G06K 9/00* (2006.01)

(52) U.S. Cl.
CPC .......... *G06F 3/0412* (2013.01); *G06F 3/1446* (2013.01); *G06F 3/044* (2013.01); *G06F 3/0416* (2013.01); *G06F 2203/04102* (2013.01); *G06F 2203/04108* (2013.01); *G06K 9/0002* (2013.01)

(58) Field of Classification Search
CPC ........ G06F 3/0412; G06F 3/044; G06F 3/041; G06F 3/0445; G06F 21/32; G06K 9/0002; G06K 9/00006; G06K 9/00
See application file for complete search history.

(56) References Cited

U.S. PATENT DOCUMENTS

| | | | | |
|---|---|---|---|---|
| 10,216,971 | B2 * | 2/2019 | Cho | G06F 3/0416 |
| 2010/0182267 | A1 * | 7/2010 | Lee | G06F 3/044 |
| | | | | 345/173 |
| 2015/0261258 | A1 * | 9/2015 | Kim | H01L 27/323 |
| | | | | 345/173 |
| 2016/0342271 | A1 * | 11/2016 | Guo | G06F 3/044 |
| 2017/0316249 | A1 | 11/2017 | Lee | |
| 2017/0344148 | A1 * | 11/2017 | Han | G06F 3/0416 |
| 2017/0344787 | A1 | 11/2017 | Cho | |
| 2019/0138123 | A1 * | 5/2019 | Jung | G06F 3/044 |
| 2019/0138131 | A1 * | 5/2019 | Kim | G06F 3/0416 |
| 2019/0179463 | A1 * | 6/2019 | Lim | G06F 3/0412 |
| 2019/0187852 | A1 * | 6/2019 | Jin | G06F 3/0412 |
| 2019/0244977 | A1 * | 8/2019 | Sasaki | G02F 1/13338 |

* cited by examiner

*Primary Examiner* — Koosha Sharifi-Tafreshi

(74) *Attorney, Agent, or Firm* — Muncy, Geissler, Olds & Lowe, P.C.

(57) ABSTRACT

A display device is disclosed, which includes: a substrate; a display layer disposed on the substrate, wherein the display layer includes a plurality of display units, and two adjacent display units of the plurality of display units are arranged by a first pitch in a first direction; and a sensing layer disposed on the display layer, wherein the sensing layer includes a first region, a plurality of first sensing units are disposed in the first region, and two adjacent first sensing units of the plurality of first sensing units are arranged by a second pitch in the first direction, wherein the second pitch is less than the first pitch.

18 Claims, 18 Drawing Sheets

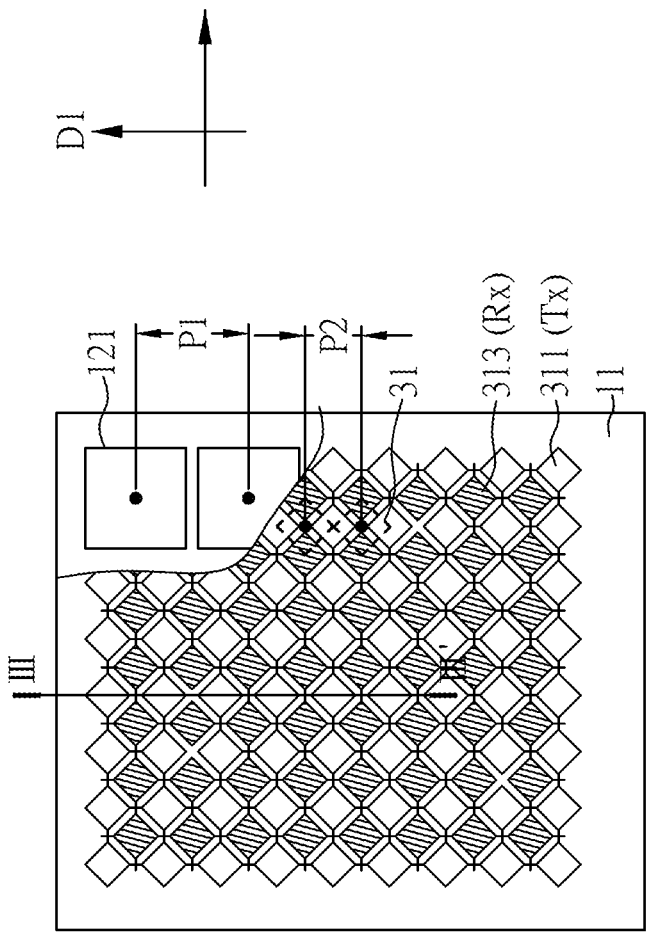
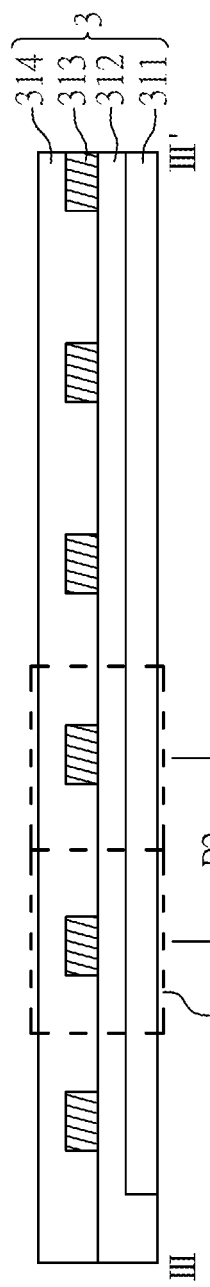
FIG. 13A
FIG. 13B

DISPLAY DEVICE

BACKGROUND

1. Field

The present disclosure relates to a display device and, more particularly, to a display device integrated with sensing units.

2. Description of Related Art

With the continuous advancement of technologies related to electronic devices, all the electronic devices are now developed toward compactness, thinness, and lightness. For example, thin display devices are the mainstream display devices on the market.

Nowadays, the display devices are required to have not only the display function but also other functions such as touch or identification functions. In addition, for the display devices to have higher display-to-body ratio, sensors of the display devices have to be embedded into display regions of the display devices. Hence, how to integrate a sensor into the display device without reducing the accuracy or the resolution of the sensor or without affecting the functions of the display device is one issue that should be solved.

SUMMARY

The present disclosure provides a display device, which comprises: a substrate; a display layer disposed on the substrate, wherein the display layer comprises a plurality of display units, and two adjacent display units of the plurality of display units are arranged by a first pitch in a first direction; and a sensing layer disposed on the display layer, wherein the sensing layer comprises a first region, a plurality of first sensing units are disposed in the first region, and two adjacent first sensing units of the plurality of first sensing units are arranged by a second pitch in the first direction, wherein the second pitch is less than the first pitch.

Other novel features of the disclosure will become more apparent from the following detailed description when taken in conjunction with the accompanying drawings.

BRIEF DESCRIPTION OF THE DRAWINGS

FIG. 13A is a perspective view of showing the relationship between display units and first sensing units in another aspect of the present disclosure.

FIG. 13B is a cross-sectional view of FIG. 13A along the line III-III'.

DETAILED DESCRIPTION OF EMBODIMENT

The following embodiments when read with the accompanying drawings are made to clearly exhibit the above-mentioned and other technical contents, features and/or effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

Furthermore, the terms recited in the specification and the claims such as "connect" is intended not only directly connect with other element, but also intended indirectly connect and electrically connect with other element.

In addition, the features in different embodiments of the present disclosure can be mixed to form another embodiment.

Embodiment 1

Figure 1A:
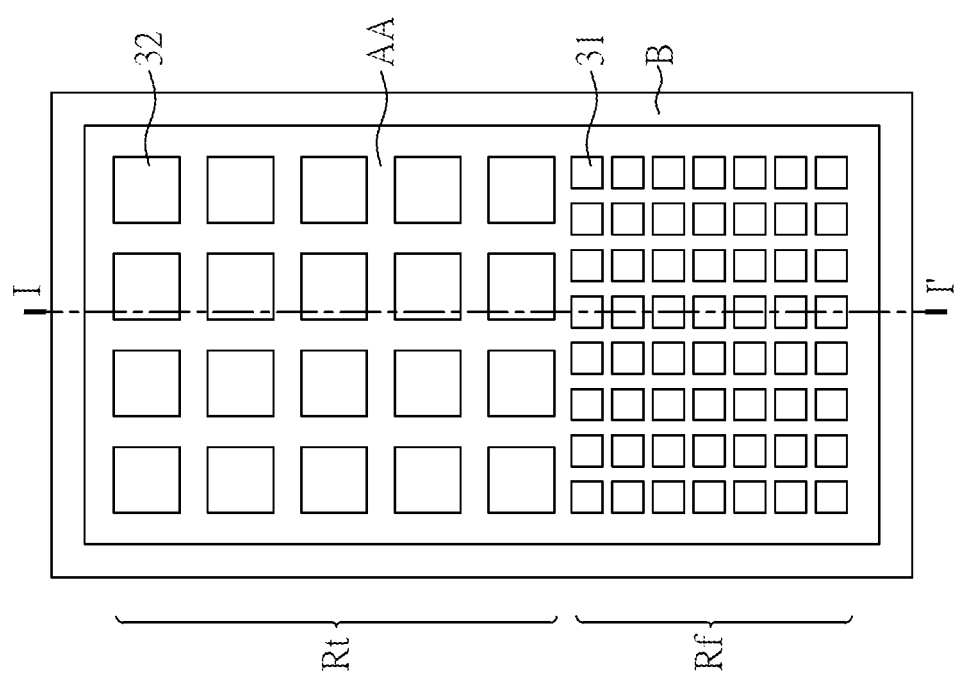
FIG. 1A is a top view of a display device according to Embodiment 1 of the present disclosure.
Figure 1B:
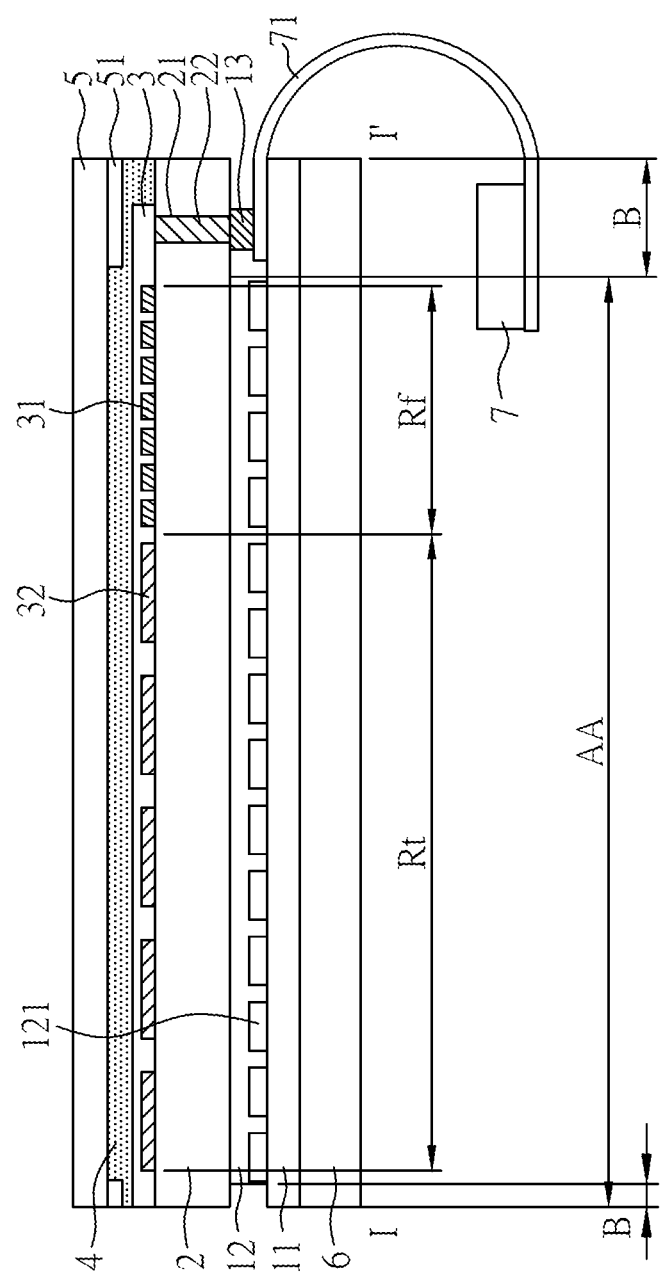
FIG. 1B is a cross-sectional view of a display device according to Embodiment 1 of the present disclosure.

FIG. 1A is a top view of a display device of the present embodiment, and FIG. 1B is a cross-sectional view of FIG. 1A along the line I-I'.

As shown in FIG. 1A and FIG. 1B, the display device of the present embodiment comprises: a substrate 11 comprising a display region AA and a non-display region B; a display layer 12 disposed on the substrate 11; and a sensing layer 3 disposed on the display layer 12. The substrate 11 can be a quartz substrate, a glass substrate, a wafer, a sapphire substrate, or etc. The substrate 11 also can be a flexible substrate such as a plastic substrate or a film, and the material of which can comprise polycarbonate (PC), polyimide (PI), polypropylene (PP), polyethylene terephthalate (PET), or other plastic material. The display layer 12 may comprise liquid crystals (LCs), quantum dots (QDs), fluorescence molecules, phosphors, organic light-emitting diodes (OLEDs), inorganic light-emitting diodes (LEDs), mini light-emitting diodes (mini-LEDs), micro light-emitting diodes (micro-LEDs), or quantum-dot light-emitting diodes (QLEDs). The chip size of the LED can be 300 µm to 10 mm, the chip size of the mini-LED can be 100 µm to 300 µm, and the chip size of the micro-LED can be 1 µm to 100 µm. However, the present disclosure is not limited thereto.

The display layer 12 may comprise display units, transistors, conductive lines, an insulating layers, etc. In the present embodiment, the display layer 12 comprises a plurality of display units 121 and a plurality of transistors (such as thin film transistors, not shown in the figure) driving the plurality of display units 121; but the present disclosure is not limited thereto. The sensing layer 3 may comprise sensing units, conductive lines, an insulating layer, etc. In addition, the sensing layer 3 comprises a first region Rf, and a plurality of first sensing units 31 are disposed in the first region Rf. In addition, the sensing layer 3 further comprises a second region Rt, and a plurality of second sensing units 32 are disposed in the second region Rt. Herein, the display units 121, the first sensing units 31 and the second sensing units 32 are disposed in the display region AA.

As shown in FIG. 1B, the display device of the present embodiment may further comprise: a first protective layer 2 disposed between the display layer 12 and the sensing layer 3, wherein the first protective layer 2 has a via 21, and a conductive element 22 is disposed in the via 21; and a first electronic component 7 electrically connected with the sensing layer 3 through the conductive element 22 in the via 21. Herein, the sensing layer 3 can be formed on the first protective layer 2 after disposing the first protective layer 2 on the display layer 12. In one embodiment, the display device may further comprise a connecting element 13 disposed on the substrate 11 and electrically connected with the conductive element 22, and the first electronic component 7 is electrically connected with the sensing layer 3 through the conductive element 22 and the connecting element 13. In addition, the first electronic component 7 can be further electrically connected with the display layer 12. Herein, the first protective layer 2 can be a rigid substrate (such as a quartz substrate, a glass substrate, a wafer, a sapphire substrate, or the like), a flexible substrate such as a plastic substrate, a polymer film (such as a poly(methyl methacrylate) (PMMA) film), a resin film, an inorganic layer, an organic layer, an inorganic-organic-inorganic (MI) layer, a polarizer, or a combination thereof, but the present disclosure is not limited thereto. The conductive element 22 may comprise any conductive material with high conductivity to reduce resistance or provide better electrical connection, and the conductive material may comprises Cu, Ag, Au, alloy or organic conductive materials thereof. The connecting element 13 may comprises a bonding pad, a wire, a print circuit board (PCB), a flexible print circuit (FPC), a chip on film (COF) circuit, a tape carrier package (TCP) circuit, a chip on glass (COG) circuit, or a combination thereof. However, the present disclosure is not limited thereto.

In the present embodiment, the first electronic component 7 is electrically connected with the connecting element 13 through a first flexible print circuit board 71, and the first flexible print circuit board 71 is electrically connected with the display layer 12. Thus, the first electronic component 7 can provide display signals to the display layer 12. Because the first flexible print circuit board 71 is bendable, the first electronic component 7 can be disposed under the substrate 11. Herein, the first electronic component 7 can be disposed on a side of the first flexible print circuit board 71 facing to the substrate 11, or another side thereof opposite to the aforesaid side. In addition, the first flexible print circuit board 71 is electrically connected with the connecting element 13 and the conductive element 22, and the conductive element 22 is electrically connected with the first sensing units 31 and the second sensing units 32 through circuits (not shown in the figure) of the sensing layer 3. Thus, the first electronic component 7 can provide sensing signals to the first sensing units 31 and the second sensing units 32. Hence, in the present embodiment, the first electronic component 7 can be a display IC integrated with a sensing IC.

In the present embodiment, the display device may further comprise: a second protective layer 5 disposed on the sensing layer 3. The second protective layer 5 can protect the sensing layer 3. In addition, the display device may further comprise a decorative layer 51 disposed on a side of the second protective layer 5 facing to the sensing layer 3, and the decorative layer 51 is disposed in the non-display region B. Herein, the display device of the present disclosure may further comprise an adhesive layer 4 disposed between the sensing layer 3 and the second protective layer 5. Hence, the decorative layer 51 is formed on the second protective layer 5 in advance, followed by forming the second protective layer 5 on the sensing layer 3 through the adhesive layer 4. The materials for the first protective layer 2 and the second protective layer 5 can be the same or different. If the material for the first protective layer 2 is a polarizer and the material for the second protective layer 5 is any other material, the thickness of the first protective layer 2 may be thicker than the second protective layer 5. If the material for the first protective layer 2 is a glass and the materials for the second protective layer 5 is any other material illustrated above, the thickness of the first protective layer 2 may be thicker than the second protective layer 5. If the material for the first protective layer 2 is a flexible substrate (such as PI) or an insulation layer, and the material for the second protective layer 5 is any other material, the thickness of the first protective layer 2 may be thinner than the second protective layer 5. However, the present disclosure is not limited thereto. In another embodiment of the present disclosure, the thicknesses of the first protective layer 2 and the second protective layer 5 can be approximately the same. In addition, the adhesive layer 4 can be an adhesive with high transmittance, such as an optical clear adhesive.

In the present embodiment, the display device may further comprise a supporting layer 6, wherein the substrate 11 is disposed between the supporting layer 6 and the display layer 12. The supporting layer 6 can be a plastic film, a resin film, a photoresist film, or the like. However, the present disclosure is not limited thereto. In another embodiment of the present disclosure, the display device may not comprise the supporting layer 6.

Embodiment 2

Figure 2:
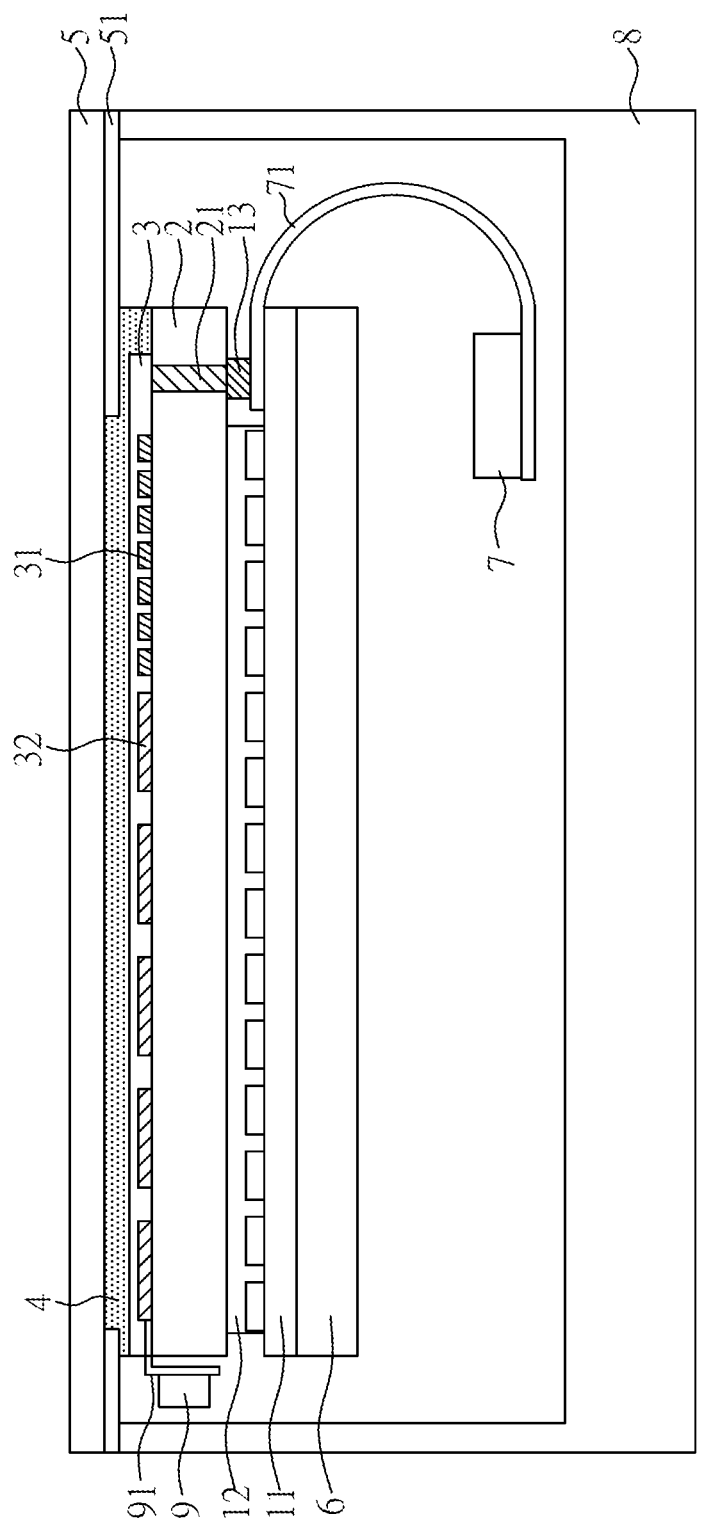
FIG. 2 is a cross-sectional view of a display device according to Embodiment 2 of the present disclosure.

FIG. 2 is a cross-sectional view of a display device of the present embodiment. The display device of the present embodiment is similar to that shown in Embodiment 1, except for the following differences.

In the present embodiment, the display device may further comprise a third electronic component 9, which is electrically connected with the second sensing units 32 through a flexible print circuit board 91. Herein, the third electronic component 9 is a sensing IC to provide sensing signals to the second sensing units 32. Hence, in the present embodiment, the first electronic component 7 provides sensing signals to the first sensing units 31. By doing this, the first electronic component 7 and the third electronic component 9 could be designed and made simpler. Also, the number of wirings connecting the sensing units to the electronic components could be reduced significantly.

In addition, the display device may further comprise a housing 8, and all the elements illustrated above are disposed in a space formed by the housing 8 and the second protective layer 5.

Furthermore, the adhesive layer 4 covers an edge of the sensing layer 3 in the right side of FIG. 2, but the adhesive layer 4 does not cover another edge of the sensing layer 3 and an edge of the adhesive layer 4 is aligned with the another edge of the sensing layer 3 in the left side of FIG. 2. However, the present disclosure is not limited thereto. In another embodiment of the present disclosure, the adhesive layer 4 may cover both edges of the sensing layer 3. In further another embodiment of the present disclosure, the adhesive layer 4 may not cover both edges of the adhesive layer 4 and are aligned with both edges of the sensing layer 3.

Embodiment 3

Figure 3:
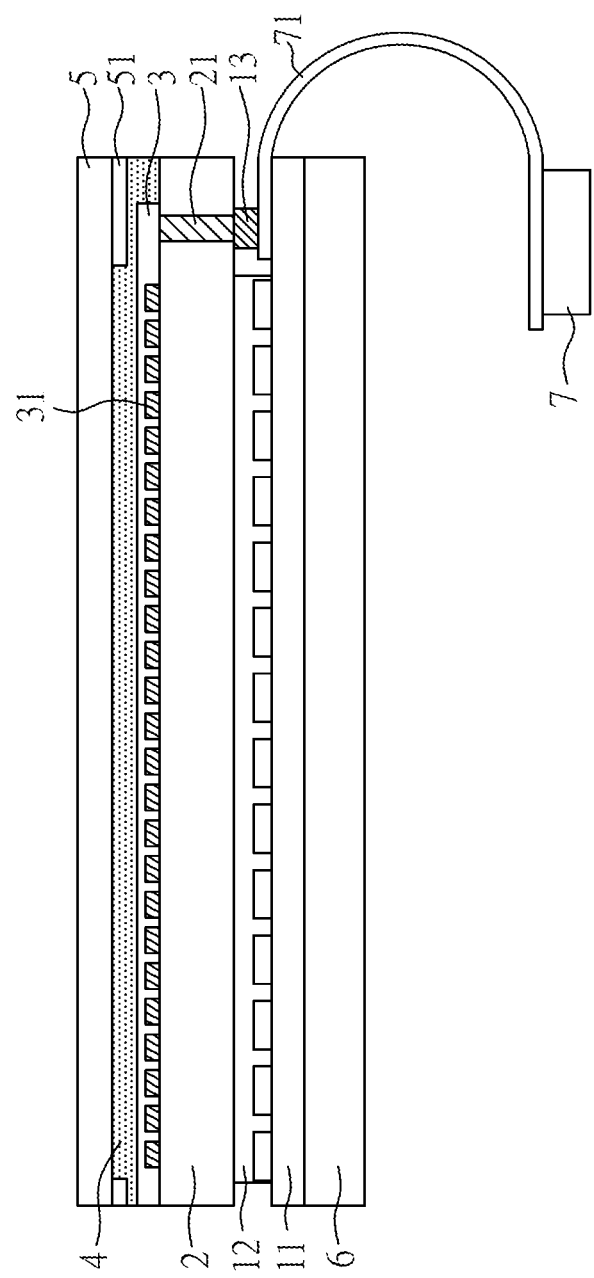
FIG. 3 is a cross-sectional view of a display device according to Embodiment 3 of the present disclosure.

FIG. 3 is a cross-sectional view of a display device of the present embodiment. The display device of the present embodiment is similar to that shown in Embodiment 1, except for the following differences.

In the present embodiment, the display device only comprises the first sensing units 31, and does not comprise the second sensing units shown in Embodiment 1. Hence, the first sensing units 31 having higher density can provide more accurate touch-sensing ability.

In addition, in Embodiment 1, the first electronic component 7 is disposed on a side of the first flexible print circuit board 71 facing to the substrate 11, as shown in FIG. 1B. In the present embodiment, the first electronic component 7 is disposed on an opposite side to the side of the first flexible print circuit board 71 facing to the substrate 11, as shown in FIG. 3.

Embodiment 4

Figure 4:
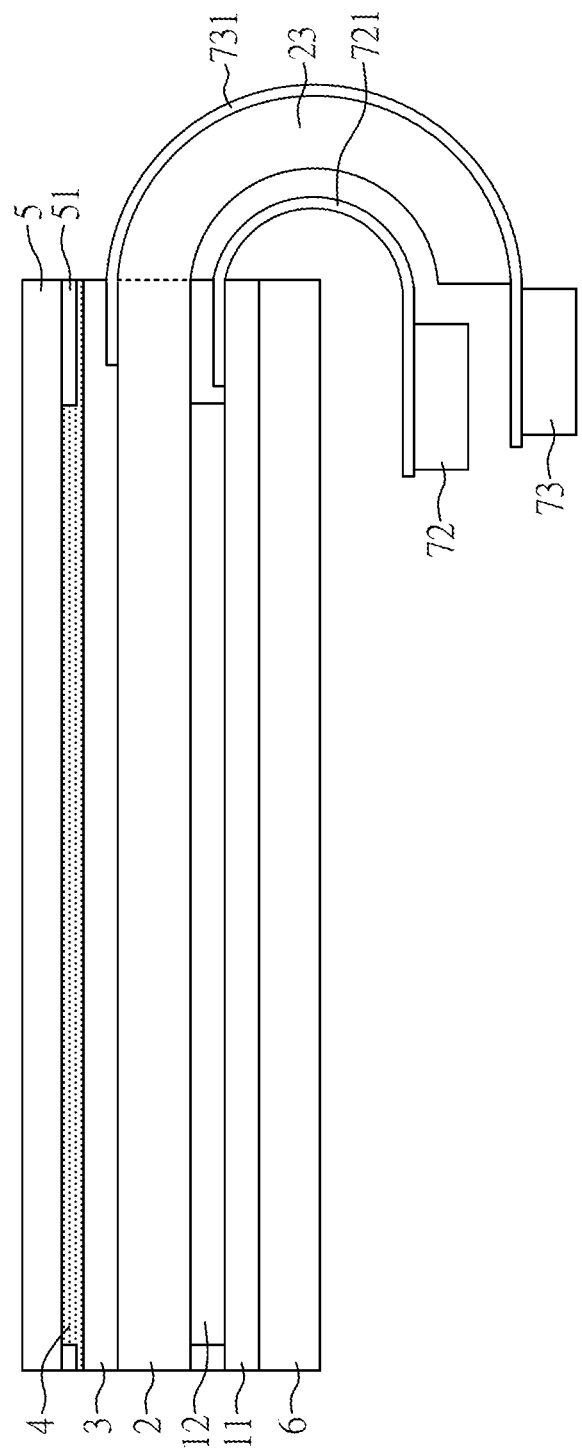
FIG. 4 is a cross-sectional view of a display device according to Embodiment 4 of the present disclosure.

FIG. 4 is a cross-sectional view of a display device of the present embodiment, in which sensing units of the sensing layer are not shown. The display device of the present embodiment is similar to that shown in Embodiment 1, except for the following differences.

In the present embodiment, the first protective layer 2 disposed between the display layer 12 and the sensing layer 3 has a first bending portion 23, and a first electronic component 73 is disposed on the first bending portion 23 and electrically connected with the sensing layer 3. Herein, the first electronic component 73 is electrically connected with the sensing layer 3 through a first flexible print circuit board 731. Hence, in the present embodiment, the first electronic component 73 is a sensing IC to provide sensing signals to the sensing layer 3. Because the first protective layer 2 is bent in the present embodiment, the first protective layer 2 has to be a flexible substrate, a polymer film, a resin film or the like. The first protective layer 2 acts as a supporting layer for the first flexible print circuit board 731.

In addition, the display device of the present embodiment further comprises a second electronic component 72 electrically connected with the display layer 12. Herein, the second electronic component 72 is electrically connected with the display layer 12 through a second flexible print circuit board 721. Hence, in the present embodiment, the second electronic component 72 is a driving IC to provide driving signals to the display layer 12.

Embodiment 5

Figure 5:
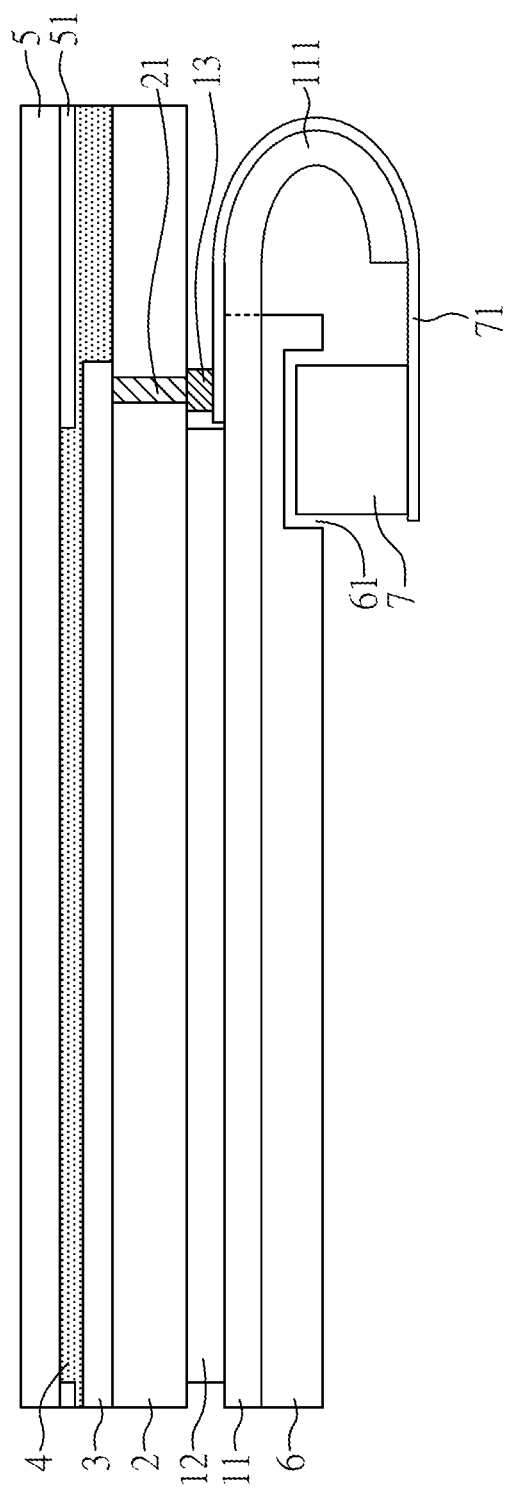
FIG. 5 is a cross-sectional view of a display device according to Embodiment 5 of the present disclosure.

FIG. 5 is a cross-sectional view of a display device of the present embodiment, in which sensing units of the sensing layer are not shown. The display device of the present embodiment is similar to that shown in Embodiment 1, except for the following differences.

In the present embodiment, the substrate 11 is a flexible substrate or a film and having a second bending portion 111, and the first flexible print circuit board 71 is further disposed on the second bending portion 111.

In addition, the first protective layer 2, the second protective layer 5, and the decorative layer 51 and the adhesive layer 4 are extended to cover the second bending portion 111 in a normal direction of the substrate 11.

Furthermore, the supporting layer 6 has a recess 61, and at least part of the first electronic component 7 is disposed in the recess 61.

Embodiment 6

Figure 6:
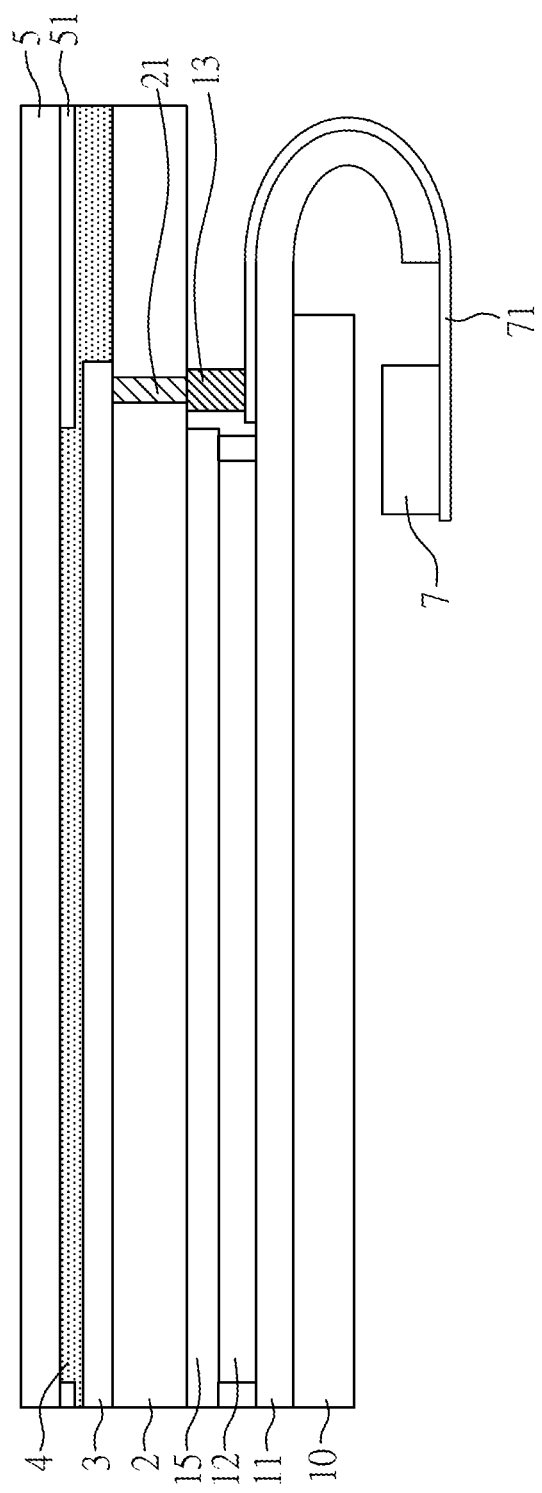
FIG. 6 is a cross-sectional view of a display device according to Embodiment 6 of the present disclosure.

FIG. 6 is a cross-sectional view of a display device of the present embodiment, in which sensing units of the sensing layer are not shown. The display device of the present embodiment is similar to that shown in Embodiment 5, except for the following differences.

In the present embodiment, the display layer 12 may comprise self-luminous medium or non-self-luminous medium. For example, the display layer 12 may comprise LCs. In this case, the display device may further comprise a counter substrate 15, and the display layer 12 is disposed between the substrate 11 and the counter substrate 15. The material for the counter substrate 15 is similar to that for the substrate 11 illustrated above, and is not repeated again.

In addition, if the display layer 12 comprises non-self-luminous medium, a backlight unit 10, not the supporting layer 6 (as shown in FIG. 5) is disposed under the substrate 11. In other words, the substrate 11 is disposed between the backlight unit 10 and the display layer 12.

Embodiment 7

Figure 7:
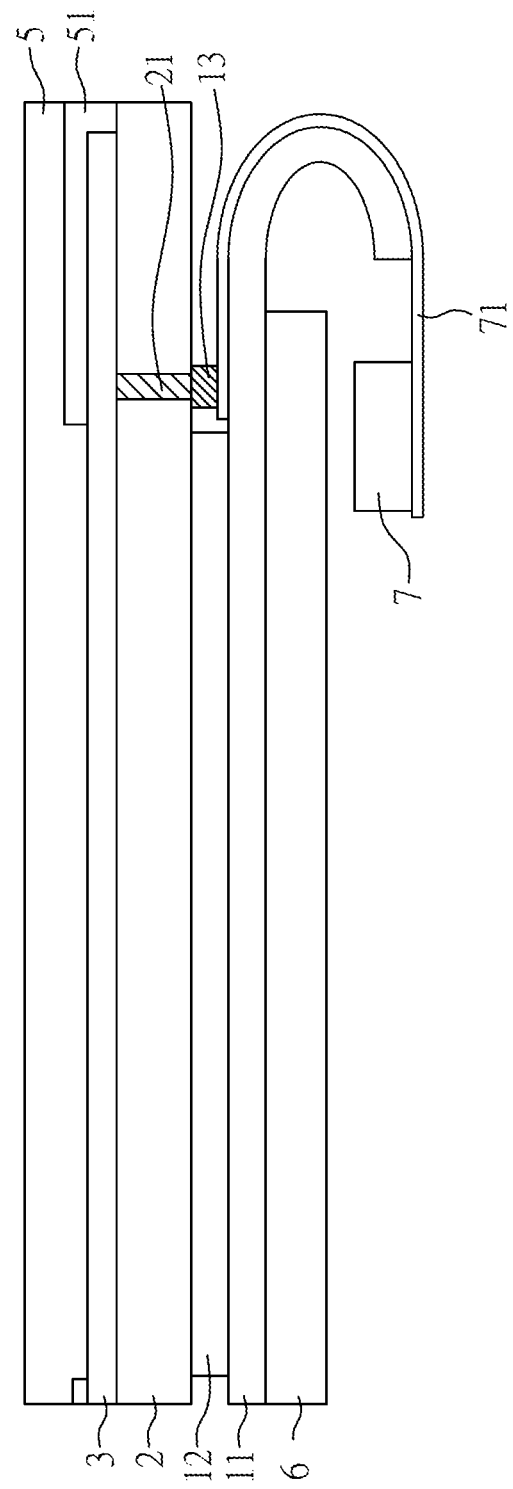
FIG. 7 is a cross-sectional view of a display device according to Embodiment 7 of the present disclosure.

FIG. 7 is a cross-sectional view of a display device of the present embodiment, in which sensing units of the sensing layer are not shown. The display device of the present embodiment is similar to that shown in Embodiment 5, except for the following differences.

In the present embodiment, the supporting layer 6 does not have a recess, and the first electronic component 7 is not embedded inside the supporting layer 6.

In addition, in the present embodiment, after forming the sensing layer 3 on the first protective layer 2, the decorative layer 51 is disposed on the sensing layer 3, and then the second protective layer 5 is further disposed on the first protective layer 2 and the decorative layer 51. Herein, the second protective layer 5 can be a coating film formed by a coating process, e.g. a resin polymer, acrylate-base polymer or other kind of coating polymers.

Embodiment 8

Figure 8A:
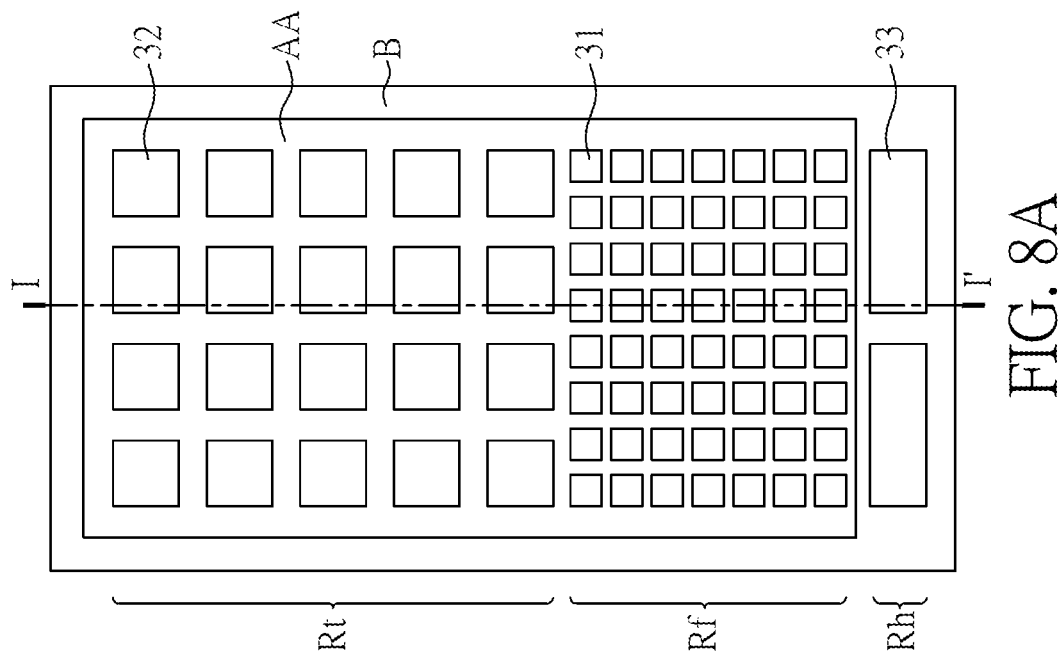
FIG. 8A is a top view of a display device according to Embodiment 8 of the present disclosure.
Figure 8B:
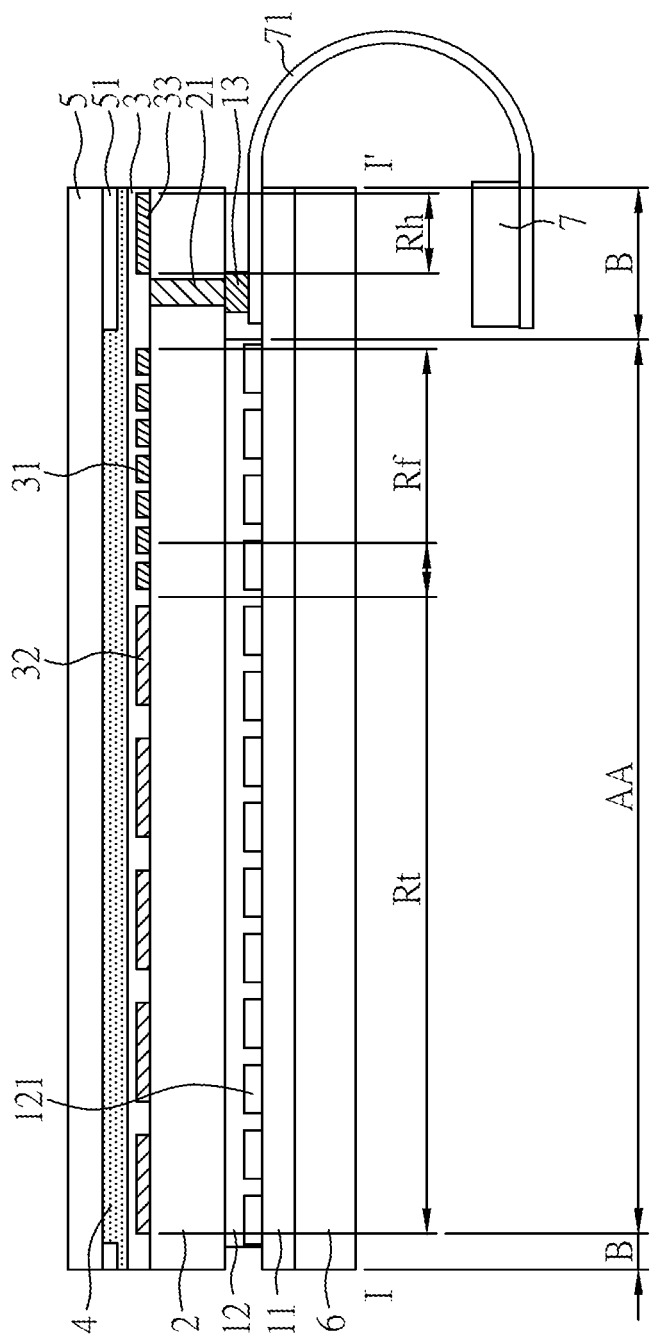
FIG. 8B is a cross-sectional view of a display device according to Embodiment 8 of the present disclosure.

FIG. 8A is a top view of a display device of the present embodiment, and FIG. 8B is a cross-sectional view of FIG. 8A along the line I-I'. The display device of the present embodiment is similar to that shown in Embodiment 1, except for the following differences.

In the present embodiment, the sensing layer 3 may further comprise a third region Rh, a plurality of third sensing units 33 are disposed in the third region Rh. Especially, the display units 121, the first sensing units 31 and the second sensing units 32 are disposed in the display region AA, and the third, sensing units 33 are disposed in the non-display region B.

In addition, the first electronic component 7 can also provide sensing signals to the third sensing units 33.

Embodiment 9

Figure 9A:
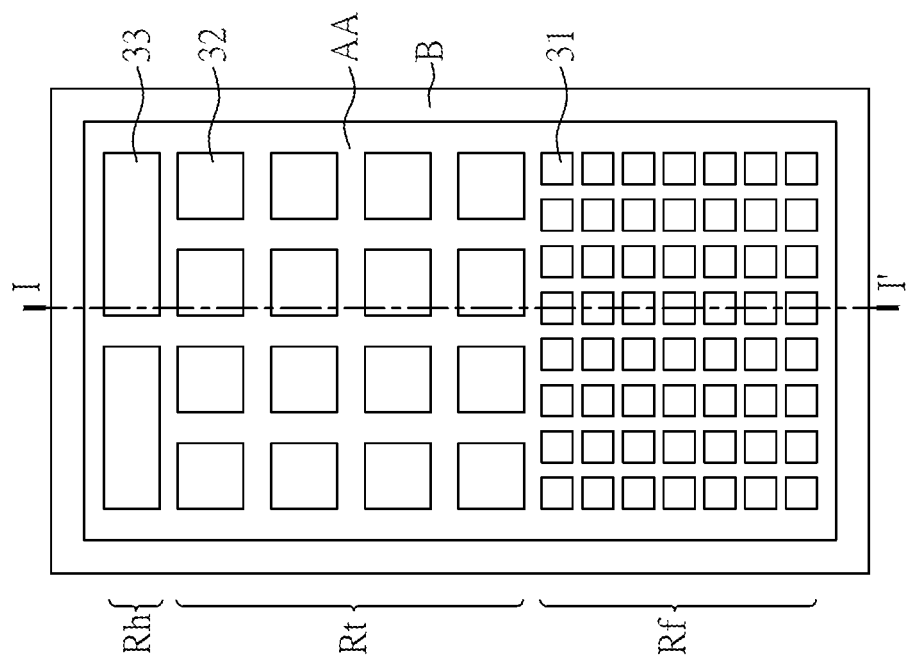
FIG. 9A is a top view of a display device according to Embodiment 9 of the present disclosure.
Figure 9B:
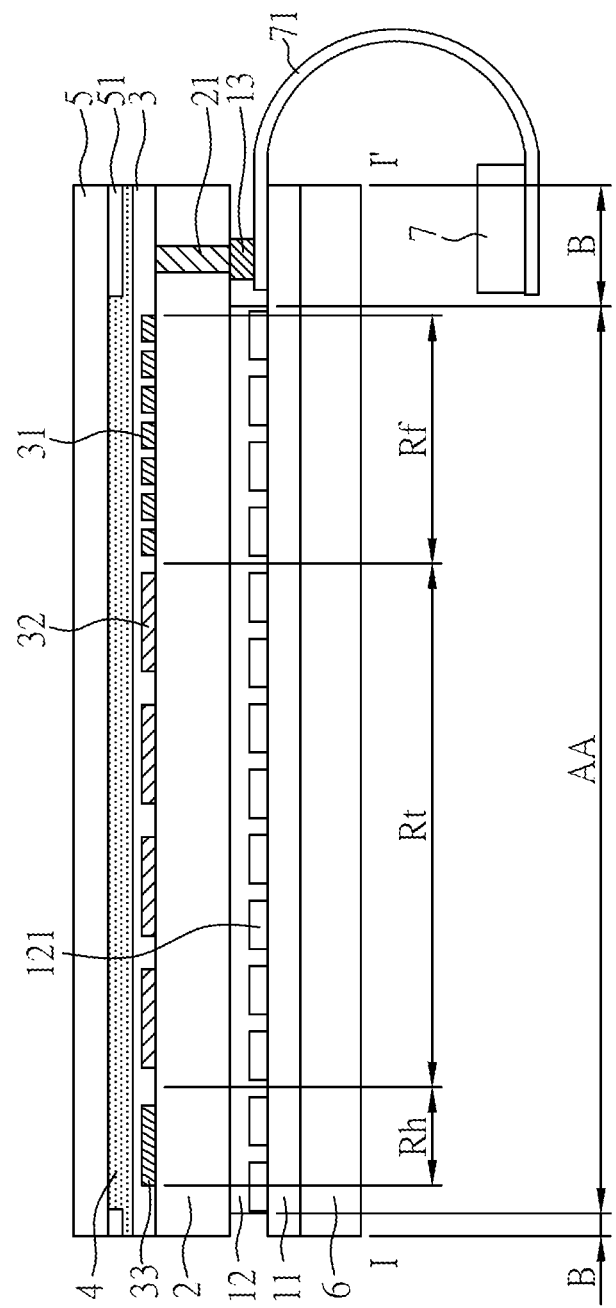
FIG. 9B is a cross-sectional view of a display device according to Embodiment 9 of the present disclosure.

FIG. 9A is a top view of a display device of the present embodiment, and FIG. 9B is a cross-sectional view of FIG. 9A along the line I-F. The display device of the present embodiment is similar to that shown in Embodiment 8, except for the following differences.

In the present embodiment, the display units 121, the first sensing units 31, the second sensing units 32 and the third sensing units 33 are disposed in the display region AA.

Embodiment 10

Figure 10:
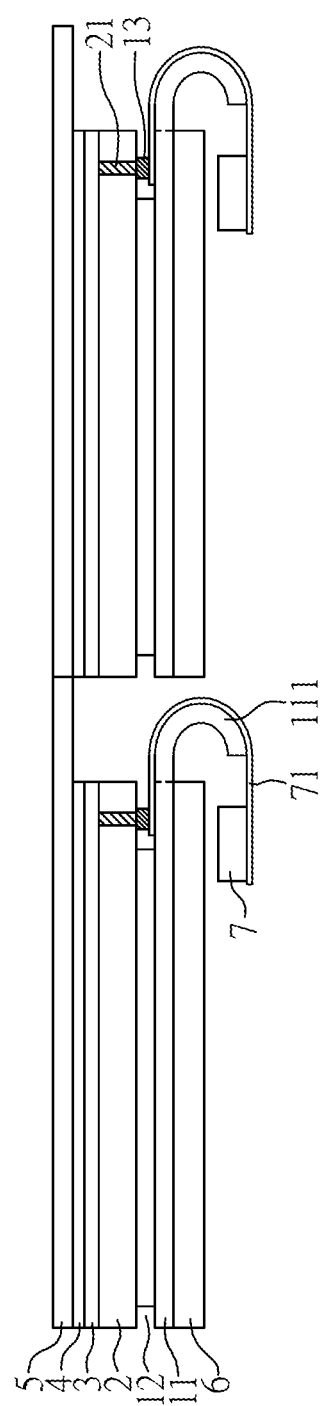
FIG. 10 is a cross-sectional view of a tiled display device according to Embodiment 10 of the present disclosure.

FIG. 10 is a cross-sectional view of a tiled display device of the present embodiment. The tiled display device of the present embodiment comprises at least one of the display devices similar to that shown in Embodiment 1, except for the following differences.

In the present embodiment, the substrate 11 is a flexible substrate or a film and having a second bending portion 111. In addition, the second protective layer 5 is extended to cover the second bending portion 111 in a normal direction of the substrate 11. Furthermore, the display device of the present embodiment does not comprise the decorative layer 51 (shown in FIG. 1B).

In the present embodiment, the tiled display device comprises at least two of the display devices tiled together, and each of the display devices shows a part of an image, a video or the like, and together forms the image, the video or the like. However, the present disclosure is not limited thereto, any one of the display device illustrated in Embodiments 1-10 can be used to form a tiled display device, or two or more types of the display device illustrated in Embodiments 1-10 can be used together to form a tiled display device.

In all the above embodiments, the sensing layer 3 is a capacitive sensing layer, so the first sensing units 31, the second sensing units 32 and the third sensing units 33 are capacitive sensing units. In addition, the first sensing units 31 can be fingerprint sensing units, the second sensing units 32 can be touch sensing units, and the third sensing units 33 can be hover or gesture sensing units, but the present disclosure is not limited thereto. Furthermore, the third sensing units 33 can sense change of capacitance value or directional change of capacitance without requiring any physical contact.

In addition, the functions of the first sensing units 31 and/or the second sensing units 32 can be adjusted by altering the driving mode. Several examples to illustrate how to alter the driving mode of the first sensing units 31 and/or the second sensing units 32 are illustrated below, but the present disclosure is not limited thereto.

In one aspect of the present disclosure, by altering the driving mode, several adjacent first sensing units 31 as the fingerprint sensing units together can be served as a touch sensing unit. For example, as shown in FIG. 1A and FIG. 1B, all the first sensing units 31 are served as fingerprint sensing units in a first frame. In a second frame, the first sensing units 31 are grouped into several first groups containing plural adjacent first sensing units 31, and one signal is provided to the plural adjacent first sensing units 31 in one first group; so each first groups can be served as a touch sensing unit. Herein, a part of or all of the first sensing units 31 are grouped into first groups.

In another aspect of the present disclosure, several adjacent first sensing units 31 as the fingerprint sensing units together can be served as a touch sensing unit and a hover sensing unit. The driving modes provided to the first sensing units 31 in the first frame and second frame are the same as those illustrated above, and are not repeated again. In a third frame, a part of or all of the first sensing units 31 are grouped into one or more second groups containing several adjacent first sensing units 31, and one signal is provided to the adjacent first sensing units 31 in one second group; so one second group can be served as a hover sensing unit. Herein, the first sensing units contained in the first groups may be the same as or different from the first sensing units contained in the second groups. Herein, a part of or all of the first sensing units 31 are grouped into second groups.

In further another aspect of the present disclosure, several adjacent second sensing units 32 can be served as a hover sensing unit. For example, as shown in FIG. 1A and FIG. 1B, all the second sensing units 32 are served as touch sensing units in a first frame. In a second frame, the second sensing units 32 are grouped into one or more third groups which containing several adjacent second sensing units 32, and one signal is provided to the adjacent second sensing units 32 in one third group; so the one third group can be served as a hover sensing unit. Herein, a part of or all of the second sensing units 32 are grouped into one or more third groups.

In all the above embodiments, the first sensing units 31, the second sensing units 32 and the third sensing units 33 shown in the figures are only for explanation, the actual numbers of the first sensing units 31, the second sensing units 32 and the third sensing units 33 depend upon the design of the display device.

Hereinafter, the relationship between the display units and the first sensing units in any one of the above embodiments are illustrated below.

Figure 11A:
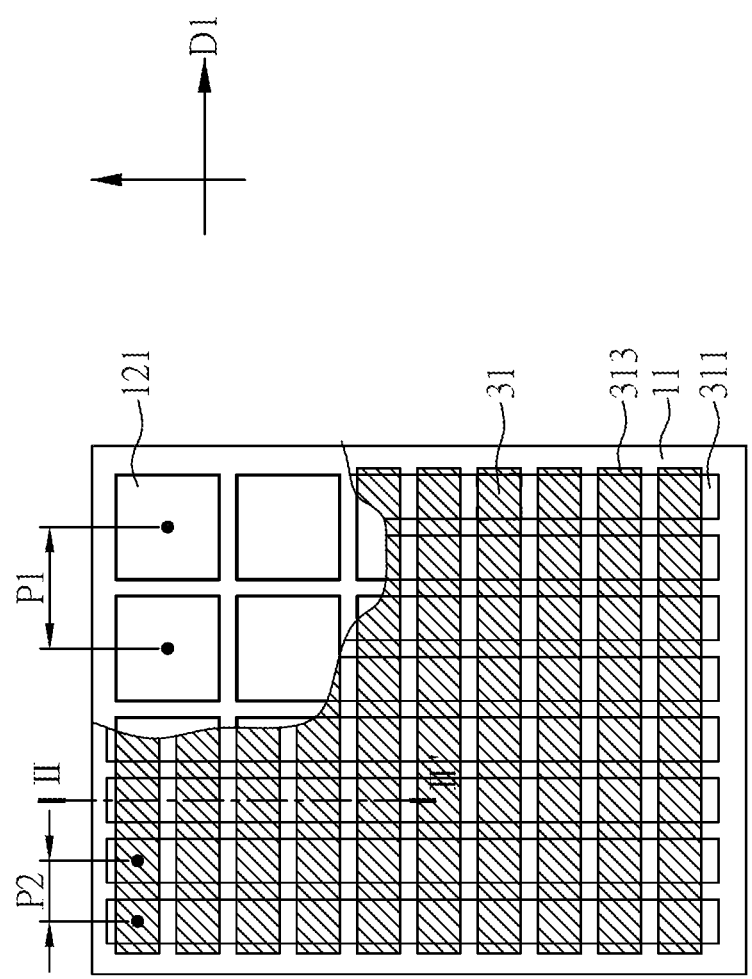
FIG. 11A is a perspective view of showing the relationship between display units and first sensing units in one aspect of the present disclosure.
Figure 11B:
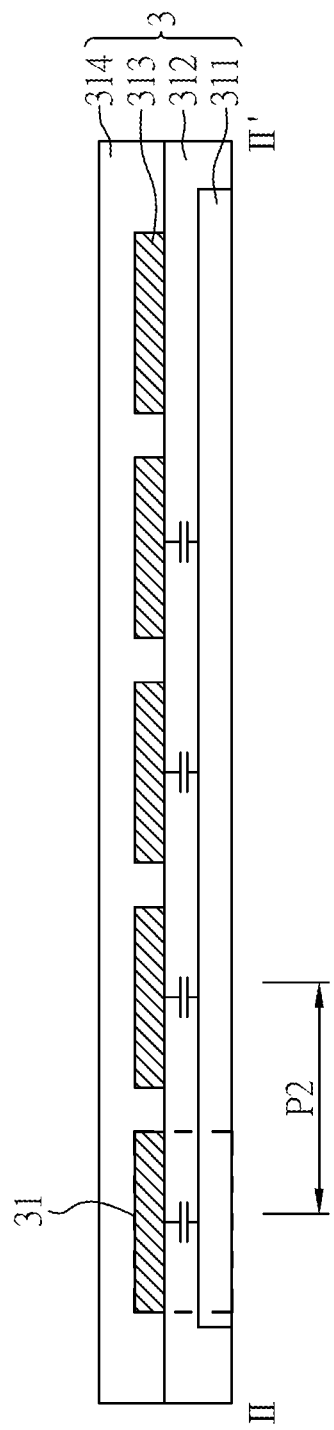
FIG. 11B is a cross-sectional view of FIG. 11A along the line II-II'.

FIG. 11A is a perspective view of showing the relationship between display units and first sensing units in one aspect of the present disclosure. FIG. 11B is a cross-sectional view of FIG. 11A along the line II-IF. Herein, the first sensing units are fingerprint sensing units.

As shown in FIG. 11B, the sensing layer 3 comprises: a first electrode layer 311; a first insulating layer 312 disposed on the first electrode layer 311; a second electrode layer 313 disposed on the first insulating layer 312; and a second insulating layer 314 disposed on the second electrode layer 313. Herein, one smallest unit capable of sensing capacitance change in the sensing layer 3 is considered as a sensing unit. More specifically, regions that the first electrode layer 311 overlaps the second electrode layer 313 are considered as first sensing units 31 (as indicated by the dashed rectangle in the figure). The first electrode layer 311 and the second electrode layer 313 may mainly comprise transparent conductive metal oxide such as ITO, IZO, ITZO, IGZO, or AZO respectively. The first insulating layer 312 and the second insulating layer 314 may respectively comprise silicon oxide, silicon oxynitride, silicon nitride, aluminum oxide, resin, polymer, photoresist, or a combination thereof.

As shown in FIG. 11A, in the display device, two adjacent display units 121 are arranged by a first pitch P1 in a first direction D1, and two adjacent first sensing units 31 are arranged by a second pitch P2 in the first direction D1. Herein, the first direction D1 can be an extension direction of a scan line or a data line. The first pitch P1 is defined by intervals of the same features of the two adjacent display units 121, and the second pitch P2 is also defined by intervals of the same features of the two adjacent first sensing units 31. For example, the first pitch P1 is defined by a distance between centers of two adjacent display units 121; but in another embodiment of the present disclosure, the first pitch P1 may be defined by a distance between the same edges of two adjacent display units 121. In addition, the second pitch P2 is also defined by a distance between centers of two adjacent first sensing units 31; but in another embodiment of the present disclosure, the second pitch P2 may be defined by a distance between the same edges of two adjacent first sensing units 31. Furthermore, one display unit 121 refers to one pixel, which may comprise plural subpixels. For example, one display unit 121 may comprise red, green and blue subpixels. Alternatively, one display unit 121 may comprise red, green, blue and white subpixels.

As shown in FIG. 11A, the second pitch P2 between two adjacent first sensing units 31 is less than the first pitch P1 between two adjacent display units 121. Hence, the disposition density of the first sensing units 31 is greater than the disposition density of the display units 121. In addition, a ratio of a number of the display units 121 per centimeter square (per inch square) to a number of the first sensing units 31 per centimeter square (per inch square) is greater than 0.1 and less than 0.9. For example, the number of display units 121 per centimeter square is 31 (per inch square is 200), the number of the first sensing units 31 per centimeter square is 62 (per inch square is 400), and the ratio thereof is 0.5; the number of display units 121 per centimeter square is 31 (per inch square is 200), the number of the first sensing units 31 per centimeter square is 310 (per inch square is 2000), and the ratio thereof is 0.1; or the number of display units 121 per centimeter square is 93 (per inch square is 600), the number of the first sensing units 31 per centimeter square is 310 (per inch square is 2000), and the ratio thereof is 0.3. However, the present disclosure is not limited thereto.

Figure 12:
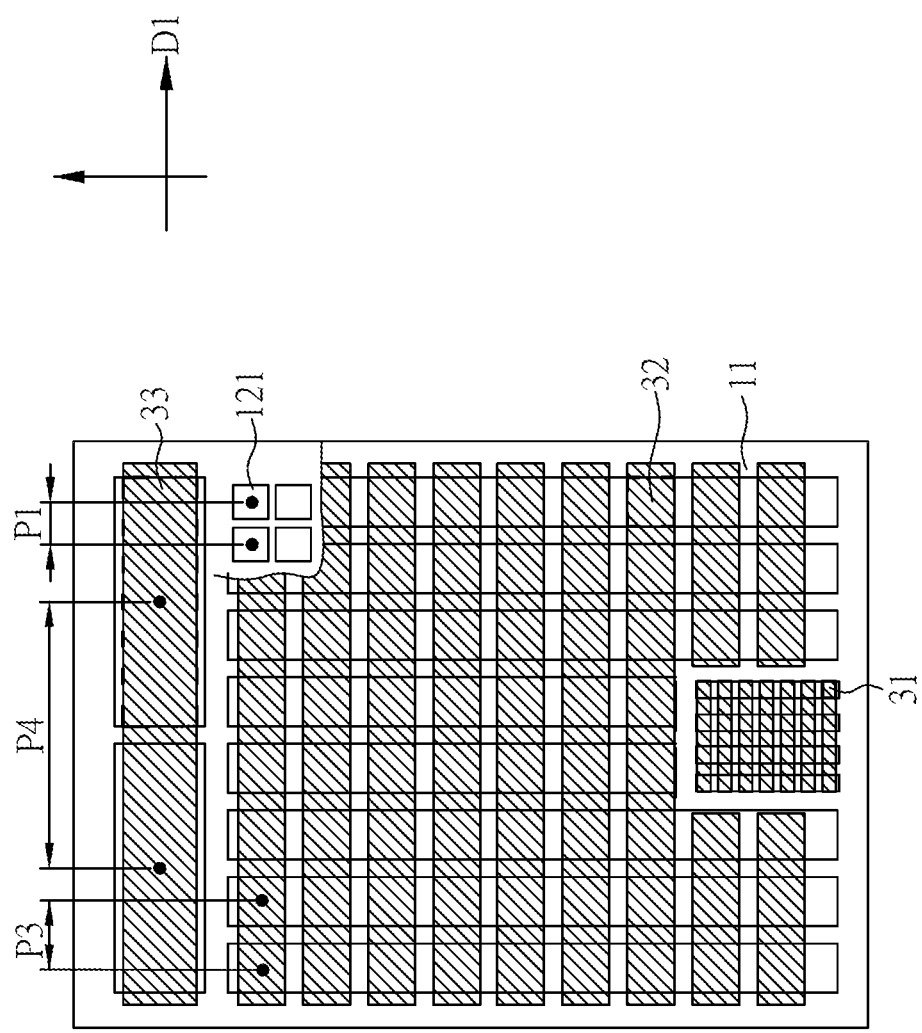
FIG. 12 is a perspective view of showing the relationship between display units, first sensing units, second sensing units and third sensing units in another aspect of the present disclosure.

FIG. 12 is a perspective view of showing the relationship between display units, first sensing units, second sensing units and third sensing units in another aspect of the present disclosure. Herein, the first sensing units are fingerprint sensing units, the second sensing units are touch sensing units, and the third sensing units are hover sensing units. The relationship between the display units and the first sensing units is similar to that shown in FIG. 11A, and is not repeated again. In addition, the structures of the second sensing units and the third sensing units are similar to the structures of the first sensing units, and only the sizes of the first sensing units, the second sensing units and the third sensing units are different.

As shown in FIG. 12, two adjacent second sensing units 32 are arranged by a third pitch P3 in the first direction D1. Similarly, the third pitch P3 is defined by intervals of the same features of the two adjacent second sensing units 32. Herein, the third pitch P3 is defined by a distance between centers of two adjacent second sensing units 32; but in another embodiment of the present disclosure, the third pitch P3 may be defined by a distance between the same edges of two adjacent second sensing units 32. Herein, the first pitch P1 between two adjacent display units 121 is less than the third pitch P3 between two adjacent second sensing units 32, so the disposition density of the display units 121 is greater the disposition density of the second sensing units 32.

In addition, two adjacent third sensing units 33 are arranged by a fourth pitch P4 in the first direction D1. Similarly, the fourth pitch P4 is defined by intervals of the same features of the two adjacent third sensing units 33. Herein, the fourth pitch P4 is defined by a distance between centers of two adjacent third sensing units 33; but in another embodiment of the present disclosure, the fourth pitch P4 may be defined by a distance between the same edges of two adjacent third sensing units 33. Herein, the fourth pitch P4 between two adjacent third sensing units 33 is greater than the first pitch P1 between two adjacent display units 121, the second pitch P2 between two adjacent first sensing units 31 (as shown in FIG. 11A) and the third pitch P3 between two adjacent second sensing units 32. However, in another embodiment of the present disclosure, the display device may only comprise one third sensing unit 33.

Figure 14:
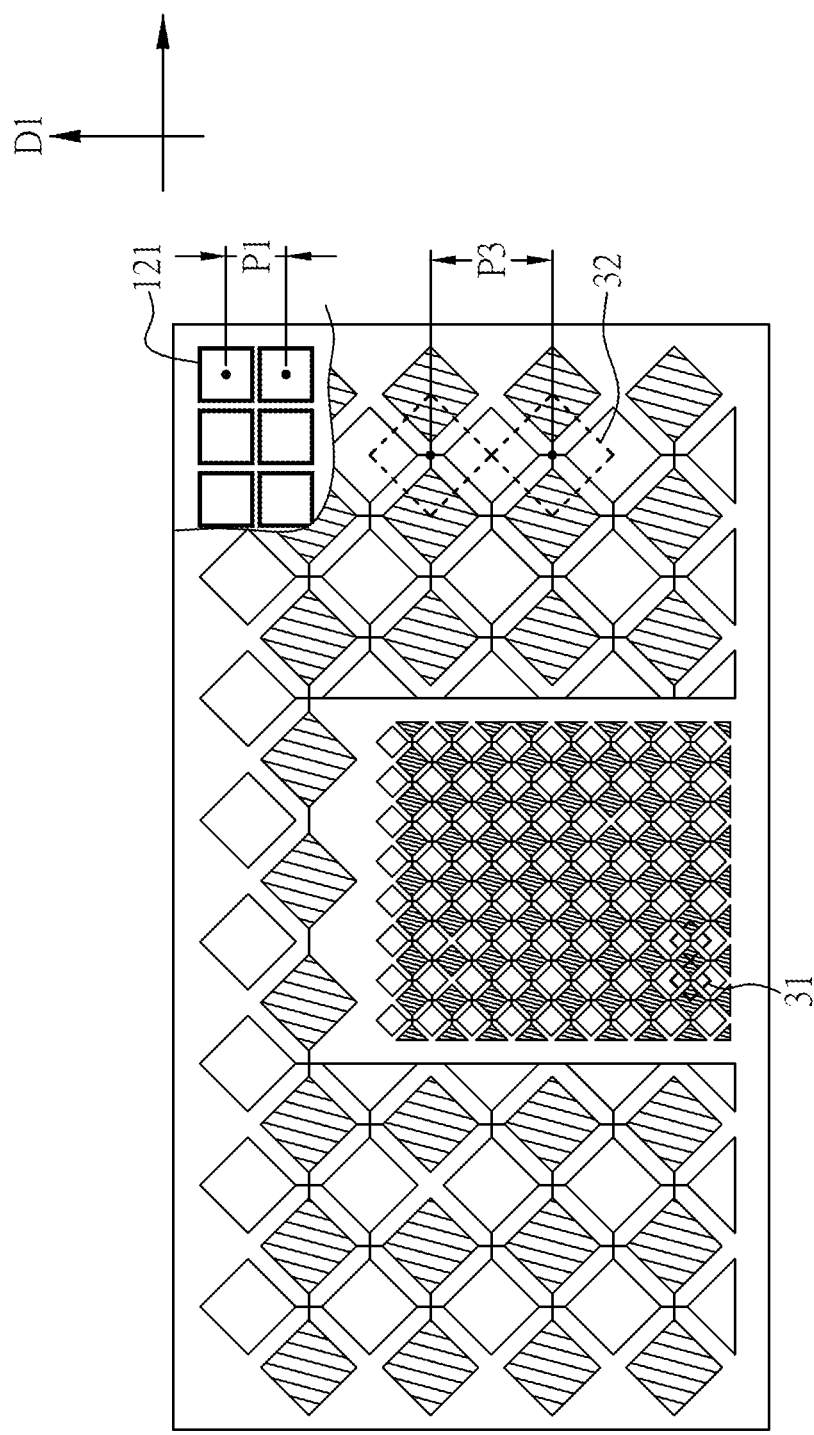
FIG. 14 is a perspective view of showing the relationship between display units, first sensing units and second sensing units in another aspect of the present disclosure.

FIG. 13A to FIG. 14 show another type of capacitive sensing layer capable of being used in the present disclosure.

FIG. 13A is a perspective view of showing the relationship between display units and first sensing units in another aspect of the present disclosure, and FIG. 13B is a cross-sectional view of FIG. 13A along the line III-III'. FIG. 14 is a perspective view of showing the relationship between display units, first sensing units and second sensing units in another aspect of the present disclosure.

As shown in FIG. 13A, FIG. 13B and FIG. 14, the sensing layer 3 comprises: a first electrode layer 311; a first insulating layer 312 disposed on the first electrode layer 311; a second electrode layer 313 disposed on the first insulating layer 312; and a second insulating layer 314 disposed on the second electrode layer 313. The materials for the first electrode layer 311, the first insulating layer 312, the second electrode layer 313 and the second insulating layer 314 are similar to those illustrate before, and are not repeated again. Herein, one smallest unit capable of sensing capacitance change in the sensing layer 3 is considered as a sensing unit. More specifically, if the first electrode layer 311 comprises Tx electrodes and the second electrode layer 313 comprises Rx electrodes, connecting lines between centers of two adjacent Tx electrodes and centers of two adjacent Rx electrodes neighboring to the two adjacent Tx electrodes can form a rectangle (as indicated by the dashed rectangles in the figure), and this rectangle is considered as a sensing unit, such as the first sensing units 31 or the second sensing units 32 shown in FIG. 13A and FIG. 14.

The pitch relationships between the display units 121, the first sensing units 31 and the second sensing units 32 are similar to those stated above, and are not repeated again.

Furthermore, the display device made as described in any of the embodiments of the present disclosure as described previously may be applied to any electronic devices known in the art that need a display screen, such as displays, mobile phones, laptops, video cameras, still cameras, music players, mobile navigators, TV sets, and other electronic devices that display images.

Although the present disclosure has been explained in relation to its embodiment, it is to be understood that many other possible modifications and variations can be made without departing from the spirit and scope of the disclosure as hereinafter claimed.

What is claimed is:

1. A display device, comprising:
   a substrate;
   a display layer disposed on the substrate, wherein the display layer comprises a plurality of display units, and two adjacent display units of the plurality of display units are arranged by a first pitch in a first direction;
   a sensing layer disposed on the display layer, wherein the sensing layer comprises a first region, a plurality of first sensing units are disposed in the first region, and two adjacent first sensing units of the plurality of first sensing units are arranged by a second pitch in the first direction;

a first electronic component electrically connected with the sensing layer and electrically connected with the display layer; and a supporting layer, wherein the substrate is disposed between the supporting layer and the display layer, wherein the second pitch is less than the first pitch, wherein the first electronic component and the sensing layer are disposed on opposite sides of the display layer.

2. The display device of claim 1, wherein a ratio of a number of the plurality of display units per centimeter square to a number of the plurality of first sensing units per centimeter square is greater than 0.1 and less than 0.9.

3. The display device of claim 1, wherein the substrate comprises a display region and a non-display region, and the plurality of display units and the plurality of first sensing units are disposed in the display region.

4. The display device of claim 1, wherein the sensing layer further comprises a second region, a plurality of second sensing units are disposed in the second region, two adjacent second sensing units of the plurality of second sensing units are arranged by a third pitch in the first direction, and the first pitch is less than the third pitch.

5. The display device of claim 4, wherein the substrate comprises a display region and a non-display region, and the plurality of display units, the plurality of first sensing units and the plurality of second sensing units are disposed in the display region.

6. The display device of claim 4, wherein the sensing layer further comprises a third region, a plurality of third sensing units are disposed in the third region, two adjacent third sensing units of the plurality of third sensing units are arranged by a fourth pitch in the first direction, and the fourth pitch is greater than the second pitch.

7. The display device of claim 6, wherein the substrate comprises a display region and a non-display region, the plurality of display units, the plurality of first sensing units and the plurality of second sensing units are disposed in the display region, and the plurality of the third sensing units are disposed in the non-display region.

8. The display device of claim 6, wherein the substrate comprises a display region and a non-display region, and the plurality of display units, the plurality of first sensing units, the plurality of second sensing units and the plurality of third sensing units are disposed in the display region.

9. The display device of claim 1, further comprising:

a first protective layer disposed between the display layer and the sensing layer, wherein the first protective layer has a first bending portion;

wherein the first electronic component is disposed on the first bending portion.

10. The display device of claim 9, further comprising a second electronic component electrically connected with the display layer.

11. The display device of claim 9, further comprising a second protective layer disposed on the sensing layer.

12. The display device of claim 11, further comprising an adhesive layer disposed between the sensing layer and the second protective layer.

13. The display device of claim 11, further comprising a decorative layer disposed on a side of the second protective layer facing to the sensing layer, wherein the substrate comprises a display region and a non-display region, and the decorative layer is disposed in the non-display region.

14. The display device of claim 1, further comprising:

a first protective layer disposed between the display layer and the sensing layer, wherein the first protective layer has a via, and a conductive element is disposed in the via;

wherein the first electronic component is electrically connected with the sensing layer through the conductive element in the via.

15. The display device of claim 14, further comprising a connecting element disposed on the substrate and electrically connected with the conductive element, and the first electronic component is electrically connected with the sensing layer through the conductive element and the connecting element.

16. The display device of claim 14, further comprising a second protective layer disposed on the sensing layer.

17. The display device of claim 16, further comprising an adhesive layer disposed between the sensing layer and the second protective layer.

18. The display device of claim 16, further comprising a decorative layer disposed on a side of the second protective layer facing to the sensing layer, wherein the substrate comprises a display region and a non-display region, and the decorative layer is disposed in the non-display region.

* * * * *